United States Patent [19]
Yuen

[11] Patent Number: 5,904,376
[45] Date of Patent: May 18, 1999

[54] COUPLING ASSEMBLY FOR A FLUID PURIFICATION SYSTEM

[76] Inventor: Po S. Yuen, 99 Edgemont Rd., Scarsdale, N.Y. 10583

[21] Appl. No.: 08/789,427

[22] Filed: Jan. 29, 1997

[51] Int. Cl.$^6$ .............................. F16L 35/00; F16L 33/00
[52] U.S. Cl. ...................... 285/39; 285/148.19; 285/220; 285/247
[58] Field of Search ..................... 285/360, 376, 285/361, 396, 402, 401, 249, 347, 24, 27, 211, 220, 245, 247, 148.19

[56] References Cited

U.S. PATENT DOCUMENTS

| | | |
|---|---|---|
| 537,439 | 4/1895 | Conley . |
| 1,782,691 | 11/1930 | Krannak . |
| 2,413,878 | 1/1947 | Maky . |
| 3,306,319 | 2/1967 | Kendt et al. ............................. 137/562 |
| 3,593,743 | 7/1971 | Guth ....................................... 137/562 |
| 4,736,969 | 4/1988 | Fouts ....................................... 285/247 |
| 5,487,833 | 1/1996 | Fife et al. ................................ 210/232 |
| 5,607,189 | 3/1997 | Howeth .................................... 285/39 |

Primary Examiner—James R. Brittain
Assistant Examiner—Gary Grafel
Attorney, Agent, or Firm—Shlesinger, Arkwright & Garvey LLP

[57] ABSTRACT

A coupling, which has a longitudinal bore for fluids to pass through, for connecting a tube to a pair of fittings that can be tightened and loosened with a wrenching tool, including a nipple positioned at one end of the coupling; a first threaded mating portion positioned at an opposite end of the coupling; a second threaded mating portion positioned adjacent the nipple; a wrenching portion disposed on the coupling having a front end and a rear end and extending above the first threaded mating portion with the wrenching portion rear end including a shoulder extending below the wrenching portion front end; and, whereby the first threaded mating portion engages one of a pair of fittings and the second mating portion engages the other of a pair of fittings.

21 Claims, 3 Drawing Sheets

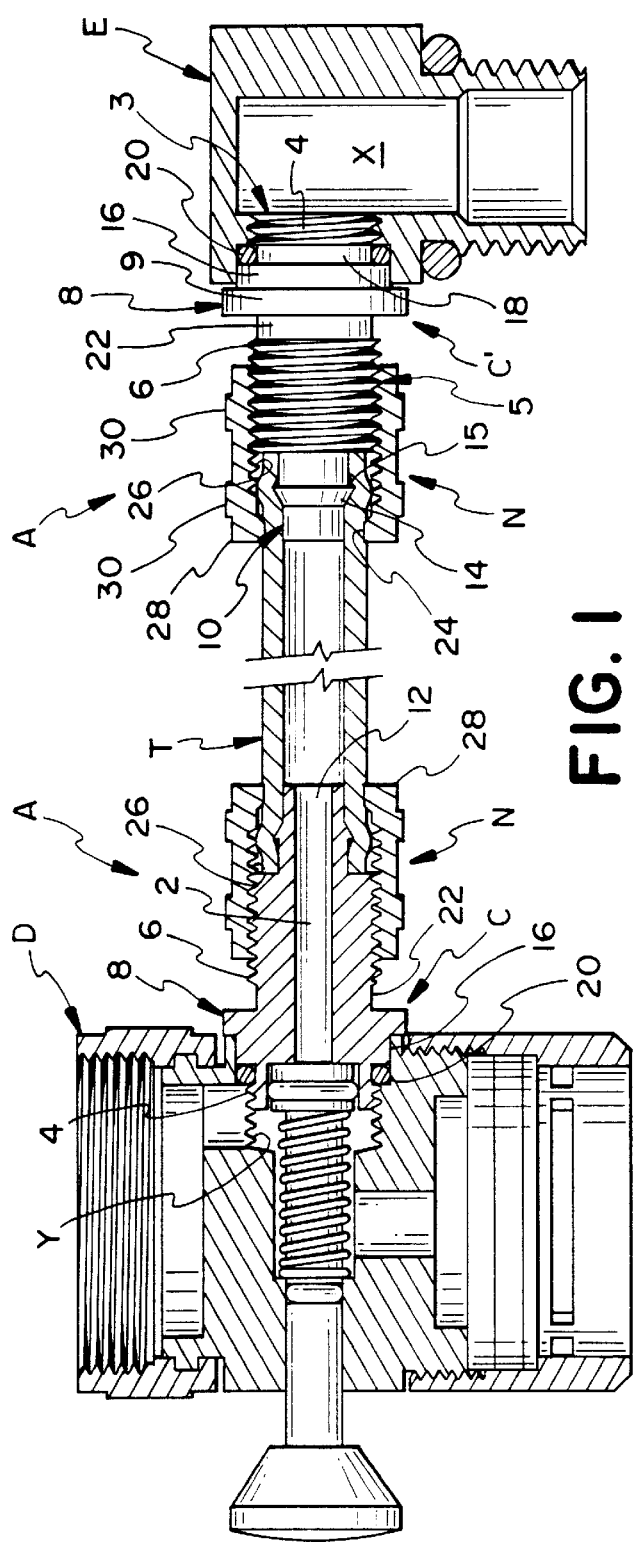
FIG. 1
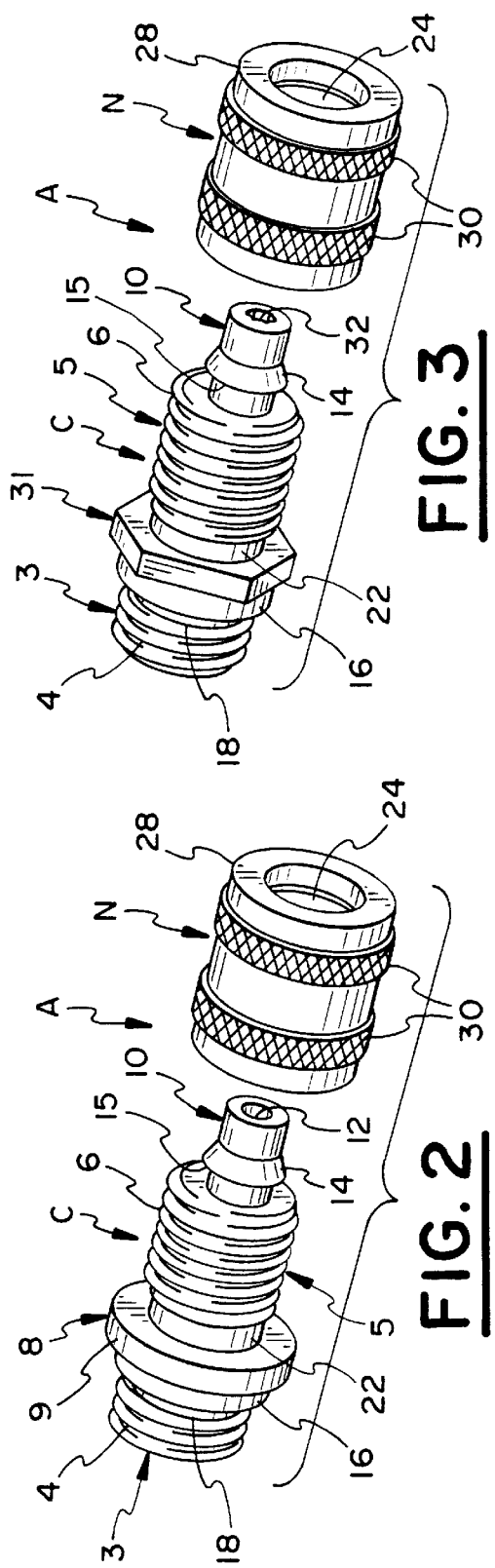
FIG. 2
FIG. 3

COUPLING ASSEMBLY FOR A FLUID PURIFICATION SYSTEM

FIELD OF THE INVENTION

This invention relates generally to fittings and more particularly to couplings that securely connect a flexible tube to other fittings such as elbows or diverters, which connect to faucets.

BACKGROUND OF THE INVENTION

In the past, there have been numerous attempts to make couplings that connect tubes to various fittings. For example, there are couplings that have an end press fitted into either the elbow or the diverter while the other end of the coupling, that connects to the tube, has a barbed nipple and a male threaded portion in conjunction with a nut N to secure the tube to the coupling.

Other couplings employ a threaded end, which screws into the diverter or the elbow, and a barbed nipple to secure the tube to the coupling.

The couplings used in the past that only employ a barbed nipple to connect to the tube have failed to provide the necessary securing of the tube. Namely, when the fluid pressure within the tube line increases, the tube will slip off the barbed nipple and cause system failure.

With regard to the couplings employing an end that is press fitted into other fittings, there have been numerous problems. For example, when a diverter malfunctions, or breaks, one cannot simply replace the diverter, but rather both the diverter and the coupling must be replaced. One must replace both because the coupling cannot be removed from the diverter, since they are press fitted together. An additional problem is that the "O" ring that seals the coupling to the diverter cannot be replaced, nor can the spring within the diverter be replaced or cleaned. Another problem that has developed with the press fit couplings is the flaking-off of any plating contained on the coupling. The flaking occurs because oil seeps out from the material of the coupling. When the coupling is being machined, oil is used to reduce the heat and to facilitate the machining. After machining, the coupling is cleaned off; however, minute amounts of oil remain in the material. Subsequent to machining, the coupling is plated with a anti-corrosion material. When the coupling is press fitted to the other fittings, such as the diverter or the elbow, the pressure exerted on the press fitted portion of the coupling causes the minute amounts of oil to seep from the coupling. This seepage forming under the plating causes the plating to flake off. The hazard is that the flakes can then pass into the fluid-line and anti-corrosion efforts are lost.

In and above these shortcomings, the previous couplings have also failed to provide an easy and efficient way to install, remove, tighten or loosen the coupling to and from other fittings. To tighten or loosen any of the previous couplings, it is likely that one would either damage necessary threads or damage or collapse the thin nipple by using some wrenching tool, like vice grips.

These attempts have not all succeeded in providing: the necessary securing of the tube to the coupling; the ability to be able to replace the diverter elbow or coupling; or, an easy and efficient way to install, remove, tighten or loosen the coupling.

OBJECTS AND SUMMARY OF THE INVENTION

It is an object of the present invention to provide an improved coupling for easily, efficiently and surely securing tubes to other fittings.

Another object of this invention is to provide a means of easily and efficiently installing, removing, tightening and loosening the coupling to and from other fittings.

Yet another object of this invention is to provide a coupling, which will allow easy replacement of other fittings attached thereto.

Still a further object of this invention is to provide a coupling, whereby any plating thereon will not flake off.

Yet another object of this invention is to provide a coupling, which will prevent a tube from slipping off the coupling as well as have the ability to be temporarily secured to other fittings.

Still a further object of this invention is to provide a coupling, which will allow easy cleaning of "O" ring seals and diverter springs.

In summary, the present invention discloses a novel configuration for a coupling assembly which includes: a coupling having a longitudinal bore for fluids to pass through; a nipple positioned on the coupling having at least one barb, where the nipple extends into the tube when in use; a first mating portion positioned on the coupling for mating with other fittings; a second mating portion positioned on the coupling between the first mating portion and the nipple; a tubing lock-nut for mating with the second mating portion, where the tubing lock-nut in conjunction with the barb prevents the tube from slipping-off said nipple when fluid-pressure is applied to the tube; and, a wrenching portion disposed on the coupling between the first and second mating portions, whereby said wrenching portion selectively adapts with the wrenching tool for tightening and loosening of the coupling to the other fittings. These and other objects of the invention will be apparent from the following:

DESCRIPTION OF THE DRAWINGS

FIG. 1 is a side elevational cross-sectional view showing two identical couplings, one coupling attached to a diverter, some of which is shown in solid, and a tube, which has break lines to indicated indeterminate length. The other coupling is shown attached to the same tube as well as an elbow; the tube, elbow and nut N of this coupling are all shown in cross-section and the body of this coupling is shown in solid.

FIG. 2 is a perspective view of a modified coupling, showing the nut N detached from the coupling.

FIG. 3 is a perspective view of a modified coupling, showing the nut N detached from the coupling with the wrenching portion being of a hexagonal profile and the longitudinal bore at the nipple end of the coupling also having a hexagonal profile.

DETAILED DESCRIPTION OF THE INVENTION

FIGS. 1–3

Figure 6:
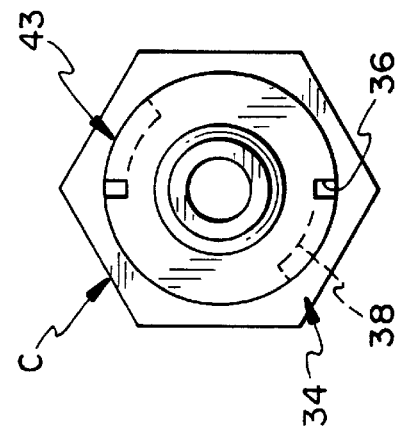
FIG. 6 is a left end view of the coupling assembly shown in FIG. 5.

In FIG. 1, two identical couplings C and C' are shown. Note, all references to either C or C' and any references connected with either are to be considered identical for both C and C'. One coupling C is threaded to a diverter D; both the coupling C and the diverter D are shown in cross section. The other coupling C is shown in solid lines and threaded to an elbow E, which is shown in cross section. Both of the identical couplings C are shown connected to a tube T, which is shown with break lines indicating indeterminate length.

The coupling assembly A is comprised of a coupling C with a longitudinal bore 2 (a hole or a hollow passage along the length the coupling) and a tubing lock-nut N.

Located at one end of the coupling C is a first mating portion 3. It is preferred that the first mating portion 3 be a first set of annular threads 4. These threads 4 may be machined or otherwise formed in a ring-like fashion around the exterior surface of the coupling C. Near the other end of the coupling C, is a second mating portion 5; it is preferred that the second mating portion 5 be a second set of annular threads 6. This second set of threads 6 may also be machined or otherwise formed in a ring-like fashion around the exterior surface of the coupling C.

It will be understood that the first and second mating portions 3 and 5 can be of numerous variations so long as the objects of the invention are maintained. Some of these variations will be discussed further below.

The first set of threads 4 is used for connecting the coupling C to other fittings, such as fitting D and E, having corresponding female threads. Shown in FIG. 1 is the first set of threads 4 of one coupling C mating with the diverter D, and the first set of threads 4 of the other coupling C mating with the elbow E.

The second set of threads 6 is used for securing the coupling's C tubing lock-nut N to the coupling C, as will be discussed further below.

The first and second set of threads 4 and 6 can be either of different or similar orientation. Meaning, one set could be left-handed threads and the other could be right-handed threads. However, it is preferred that both sets of threads 4 and 6 have the same orientation, in particular, right-handed orientation.

It is preferred that the threads 4 be fewer in number than the threads 6 and that the outer diameters of the threads 4 and 6 be of the same dimension. Since the threads 4 will connect into the fittings D and E where the direction of travel of the fluid changes by about 90 degrees, it is important that the threads 4 do not extend too far into the fittings D and E. Otherwise, the threads will hinder the flow of the fluid. For example, in FIG. 1, the threads 4 are shown threaded into the elbow E. Note how the threads 4 do not protrude completely to the opposing side of the main chamber X of the elbow E. The threads 6 will need to be of a number to allow a secure fitting with the nut N. It is preferred that the threads 4 be three to five threads and the threads 6 be six to nine threads.

Positioned on the coupling C between the threads 4 and 6 is an annular wrenching portion 8. The wrenching portion 8 selectively adapts with a wrenching tool (not shown) for installing, removing, tightening and loosening of the coupling C to and from the other fittings. The wrenching portion 8 has an exterior surface 9. The surface 9, which comes into contact with the wrenching tool, can be located at any radial distance from the longitudinal axis of the coupling C. In other words, the wrenching portion 8 could be either a flange, as shown in FIGS. 1–3, (a section protruding radially outward from the coupling C), or it could be a portion that is recessed or even flush with the coupling C. However, it is preferred that the wrenching portion 8 have the greatest radial distance from the longitudinal axis of the coupling C of any element located thereon. The wrenching portion 8 will be discussed further below.

Located at the opposite end of the coupling C from the threads 4, is a nipple 10. The threads 6, mentioned above, are positioned between the nipple 10 and the wrenching portion 8. The nipple 10 is the section of the coupling C that is to extend into the tube T. Note, the outside diameter of the nipple 10 should be slightly less than the inside diameter of a standard sized tube T for each particular application. As aforementioned, the longitudinal bore 2 runs along the longitudinal axis of the coupling C and the entire length of the coupling C. Accordingly, the longitudinal bore 2 forms the end inside surface 12 of the nipple 10. When the nipple 10 is inserted into the tube T, fluid is able to pass from the tube T through the coupling C. To prevent the nipple 10 from slipping out of the tube T, the nipple 10 has at least one barb 14 that extends radially outward from the radial surface of the nipple 10. The barb 14 is a section of material that is configured to allow insertion of the nipple 10 into the tube T. Additionally, the barb 14 is configured with a flange portion 15 having a diameter greater than the inside diameter of the flexible tube T, so as to hinder the nipple 10 from easily slipping away from the interior wall of the tube T. The nipple 10 and its end inside surface 12 profile (side view) will be discussed further below.

Disposed on the coupling C and between the wrenching portion 8 and the threads 4 is a shoulder 16. Disposed on the coupling C, between the shoulder 16 and the threads 4, is a first annular groove 18. The first annular groove 18 allows for the seating of a static seal such as a gasket or an "O" ring; shown in FIG. 1 is an "O" ring 20. For proper sealing purposes and to prevent fluid leaks, it is preferred that the first annular groove 18 have a diameter less than the outside diameter of the threads 4 and that shoulder 16 have a larger diameter than the threads 4 to provide axial support for the "O" ring 20. Basically the shoulder 16 provides a wall for the "O" ring 20 to be pressed against when the coupling C is connected to other fittings. Note, it is also preferred that the wrenching portion 8, mentioned above, be of a larger diameter than the shoulder 16, to allow for easy mating with a wrenching tool (not shown).

Disposed on the coupling C, between the wrenching portion and the threads 6, is a second annular groove 22. It is preferred that the diameter of the second annular groove 22 be about equal to the diameter of the first annular groove 18.

The tubing lock-nut N is a standard nut N that is well known in the art and is commonly used to secure flexible tubes to couplings. The nut N has a longitudinal bore, the nut N bore 24, with annular internal threads 26, which may be machined or otherwise formed into the interior surface of the nut N. The internal threads 26 are the same orientation as the threads 6, to allow them to mate. The nut bore 24 should have a greater diameter than the outside diameter of the flexible tube T. Accordingly, the nut bore 24 diameter could vary for different applications and fields of art. The nut N also has a locking end 28. At the locking end 28, the diameter of the nut N bore 24 narrows to a diameter just slightly greater than the outside diameter of the tube T.

Accordingly, when the tube T is inserted through locking end 28 of nut bore 24, and slid over the nipple 10 as well as the barb 14, the outside diameter of the flexible tube T will expand owing to the larger diameter of the barb 14. With an expanded diameter, the tube T will be unable to slip through the nut N bore 24 since the locking end 28 has a diameter almost equal to the tube's T original diameter.

The tubing lock-nut N can be easily tightened and loosened to the threads 6 by numerous means. For example, the means could be, as shown, at least one annular band of knurls 30 around the outer surface of the nut N (two bands are shown). Alternatively, the means could be multiple planar surfaces (not shown), hexagonal, around the outer surface of the nut N so as to correspond with a wrenching tool.

ALTERNATIVE CONFIGURATIONS

FIGS. 2 and 3

There are possible variations of the wrenching portion 8. FIG. 2 shows the wrenching portion 8 as a disc shaped element with a circular perimeter for corresponding with the wrenching tool (not shown). Alternatively, the wrenching portion 8 could be disc shaped element with at least two planar exterior surfaces, for corresponding with the wrenching tool. FIG. 3 shows the modified wrenching portion 31 with such planar surfaces, but in this figure it is shown with a hexagonal perimeter (six planar surfaces). Note, as mentioned above, the wrenching portion 8 could also be recessed below the shoulder 16 and the second annular groove 22 (not shown). Various diameters of the wrenching portion 8 are within the scope of the present invention, so long as a wrenching tool or device can mate with it to allow for easy installation, removal, tightening and loosening of the coupling C to the other fittings.

Additionally, there are possible variations of the nipple 10. FIG. 2 shows the nipple 10 with its end inside surface 12 having a circular profile (a side view). It is important to note that the nipple 10 can be modified for mating with a tool for installation, removal, tightening and loosening of the coupling C to other fittings; this modification can be seen in FIG. 3. FIG. 3 shows the nipple 10 with its end inside surface 32 having a hexagonal shaped profile. As is apparent, the hexagonal end inside surface 32 does not have a uniform dimension. Note, the end inside surface 32 can be of any polygonal shaped profile. With the modification to the nipple 10, if one desires not to use a wrenching tool in conjunction with the wrenching portion 8 or 31, one could use a tool, such as an allen wrench, in the end inside surface 32, at the nipple 10 to tighten or loosen the coupling C to or from the other fittings.

FURTHER ALTERNATIVE CONFIGURATIONS OF THE COUPLING ASSEMBLY

FIGS. 4–10

There can be numerous modifications to the second mating portion 5. A first modification can be seen in FIGS. 4–6 and a second modification can be seen in FIGS. 7–9. A corresponding nut N modification for each modification of the second mating portion 5 can be seen in FIG. 10. The nut N rotationally attaches to the coupling in each of the modifications to the second mating portion 5.

Figure 4:
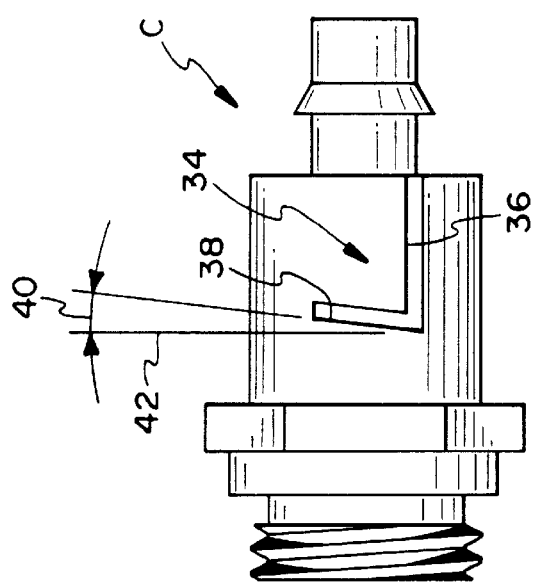
FIG. 4 is a side elevational view of an alternative embodiment of the coupling.

In FIG. 4, the modification to the second mating portion 5 is a channel 34 disposed on the coupling C. The channel 34 includes a first channel portion 36 that is substantially parallel, or aligned, with the longitudinal axis of the coupling C. The channel 34 also includes a second channel portion 38, which extends the channel annularly on the coupling C about the longitudinal axis of the coupling C. Furthermore, the second channel portion 38 is angled 40 in a direction toward the nipple 10. It is noted that the second channel portion 38 can continue the channel from the first channel portion 36 in either a clockwise or counter-clockwise rotation around the coupling C, clockwise is shown. The purpose for having an angle 40 is to allow the nut N to be locked to the coupling C, as will be described further below.

Figure 5:
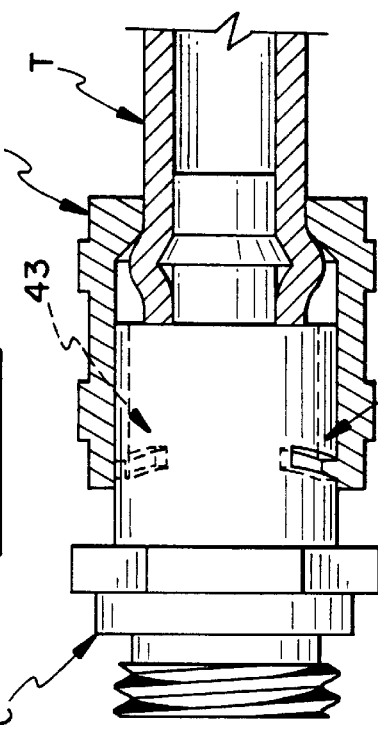
FIG. 5 is a side elevational view of the alternative embodiment shown in FIG. 4, also displaying the tube and the nut in cross-sectional view with the nut in a partially locked position.

The locking angle 40 is the angle between the direction of the second channel portion 38 and reference line 42. The reference line 42 is simply a perpendicular line from the first channel portion 36. The angle 40 is preferred to be small, and should be within the range from about 2° to about 25°. However, it is understood that nearly any angle 40 will work so long as the nut N locks into position, as will be discussed further below. It is noted that in FIG. 5, the same modification shown in FIG. 4 is depicted, but the coupling has been rotated about its longitudinal axis. FIG. 5 also depicts the tube T attached to the nipple 10 as well as the nut N being partially secured to the coupling C. Also shown in FIG. 5, are two channels 34 and 43 on the coupling C. The second channel 43 is identical to channel 34, except that it is simply located at a different location on the coupling C. It is noted that there only needs to be at least two of these channels 34 and 43 on the coupling C. In other words, there could be more than two of these angled channels 34 and 43.

In FIG. 6, a left end view of the coupling C is shown. The channels 34 and 43 are shown in hidden lines.

Figure 7:
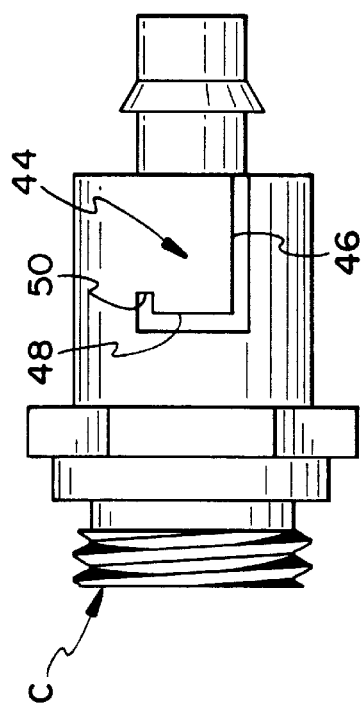
FIG. 7 is another alternative embodiment of the coupling.

In FIG. 7, a second modification to the second mating portion 5 is shown. This second rotational mating portion 5 is a modified channel 44. The modified channel 44 is made up of three parts, namely, a modified first channel portion 46, a modified second channel portion 48 and a third channel portion 50. The modified first channel portion 46 is substantially parallel, or aligned, with the longitudinal axis of a coupling C. The modified second channel portion 48 extends the modified channel 44 in a annular direction on the coupling C and about its longitudinal axis. It is noted that the modified second portion can either be directed in a counter-clockwise or clockwise direction, clockwise is shown. The third channel portion 50 extends the modified channel 44 in a direction substantially parallel, or aligned, with the longitudinal access of the coupling C and in a direction substantially toward the nipple 10. It is critical that the third portion 50 extend substantially toward the nipple 10, so the nut N can lock onto the coupling C, as well be described below.

Figure 8:
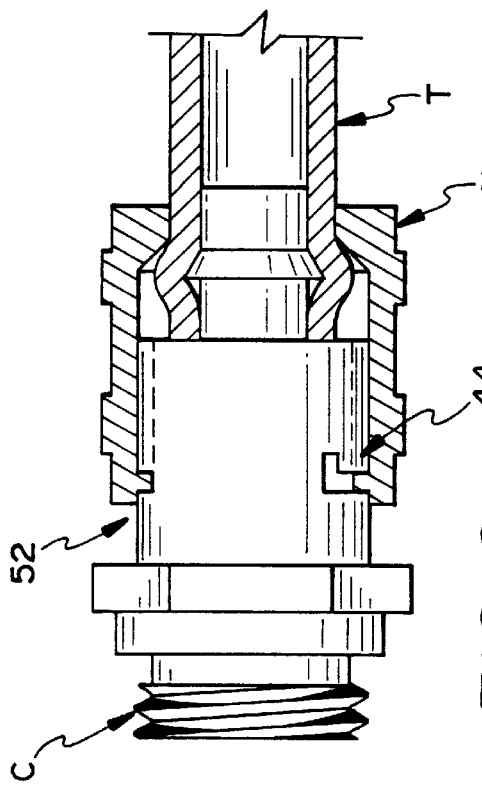
FIG. 8 is a side elevational view of the alternative embodiment shown in FIG. 7, also displaying the tube and the nut in cross-sectional view with the nut in a partially locked position.

FIG. 8 displays the modification shown in FIG. 7, but the coupling C has been rotated so as to show a second modified channel 52. The second modified channel 52 has all the same parts as the modified channel 44. FIG. 8 also displays the tube T attached to the nipple 10 as well as the nut N in a partially locked position onto the coupling C. It is noted and understood that there could be more than two modified channels 44 and 52 on the coupling C.

Figure 9:
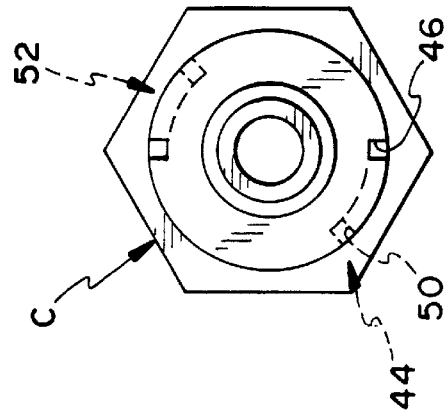
FIG. 9 is a left end view of the coupling assembly shown in FIG. 8.

FIG. 9 is a left end view of the coupling C showing the channels 44 and 52 in hidden lines.

Figure 10:
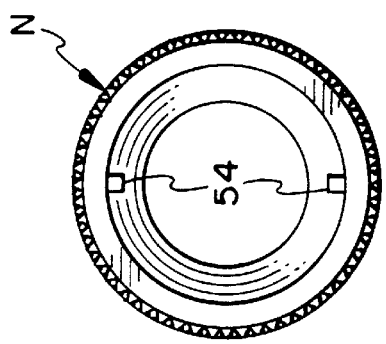
FIG. 10 is a left end view of only the nut.

FIG. 10 is a left end view of the nut N. FIG. 10 displays the locking nubs 54. The locking nubs 54 are for engaging any of the channels (34 and 43 or 44 and 52) of either modification described above for the second mating portion 5. With regard to the first modification to the second mating portion 5, namely, the modifications shown in FIGS. 4–6, the locking nubs 54 would travel in the channels 34 and 43. When tightening the nut N to the coupling C, the locking nubs 54 will travel through the first channel portion 36, of each channel 34 and 43, and then the nut N would be rotated in the direction of the second channel portion 38, of each channel 34 and 43, so as to lock the nut N to the coupling C. Since the second channel portions 38 are angled toward the nipple 10, the nut N will not slip away from the coupling C when fluid pressure is applied to the tube T, which the nut N is locking to the coupling C.

With regard to the second modification to the second mating portion 5, shown in FIGS. 7–9, the locking nubs 54 will travel in the channels 44 and 52. When tightening the nut N to the coupling C, the locking nubs 54 will travel through the modified first channel portion 46, of each channel 44 and 53, and then the nut N is rotated so that the locking nubs 54 travel through the modified second channel portions 48, of each channel 44 and 52, and finally the locking nubs 54 will lock into the third portions 50 of each of the channels 44 and 52, so as to lock the nut N to the coupling C.

Since the third channel portions 50 are in a direction toward the nipple 10, the nut N will not slip away from the coupling C when fluid pressure is applied to the tube T, which the nut N is locking to the coupling C. In other words, the locking nubs 54 will not be able to travel back through the channels 44 and 52 until a user desires to remove the nut.

As described above, these modifications could have more than two channels 34 and 43 or 44 and 52 per coupling C. The nut N should have the same number of locking nubs 54 as there are channels on the coupling C.

It is important to note, the couplings C, coupling assemblies A and their possible modification can be used alone or combined in any combination within a tubing system. For example, a divert D could be connected to a tube T using a coupling assembly A; then the tube T could be connected to an elbow E also using a coupling assembly A; a second tube could then be attached to the elbow E using a coupling assembly A; and, then the second tube could be attached to any other fitting using a coupling assembly. The system just described could further include more coupling assemblies A and other fittings (not shown). It is also important to note, any equivalent modifications to the coupling assembly A are also within the scope of the present invention.

OPERATION

The coupling assembly A attaches the tube T to fittings D and E. An "o" ring 20 is placed in the first annular grove 18, to ensure no fluid leakage. The coupling C is then attached to the diverter D by mating the threads 4 with the threads Y of the diverter D. The coupling is tightened to the diverter D by using a wrenching tool and selecting to use the tool with either the wrenching portion 8 (or the modified wrenching portion 31) or, if applicable, the modified end inside surface 32. The tube T is then threaded through the locking end 28 of the nut N and subsequently forced onto the nipple 10 and over the barb 14. The nut N is then screwed onto the threads 6, to ensure the attachment of the tube T. Note, any of the modifications mentioned above could be employed instead of threads 6. Also note, it is obvious that the tube T could be attached to the coupling C prior to the coupling C being attached to the diverter D; the order can vary. The present invention, having both the threads 4 and the threads 6, allows one to freely connect and disconnect the coupling assembly A to other fittings for cleaning and replacement of parts, as well as allows one to firmly secure a flexible tube T to the coupling, without the fear of the tube T slipping off. Moreover, having threads at both ends prevents flaking of the plating. Additionally, the present invention's wrenching portion 8 will allow one to easily install, remove, tighten and loosen the coupling to and from other fittings with a wrenching tool, without damaging the coupling C. The present invention also enables one to use an allen wrench, a wrenching tool, in correspondence with a modified nipple 10 to easily install, remove, tighten and loosen the coupling to and from other fittings, without damaging the coupling C.

While this invention has been described as having a preferred design, it is understood that it is capable of further modifications, uses and/or adaptations of the invention following in general the principle of the invention and including such departures from the present disclosure as come within the known or customary practice in the art to which the invention pertains, and as may be applied to the central features hereinbefore set forth, all fall within the scope of the invention and of the limits of the appended claims.

What is claimed is:

1. A coupling for connecting a tube to a pair of fittings that can be tightened and loosened with a wrenching tool, comprising:
   a) said coupling having a longitudinal bore for fluids to pass through;
   b) a nipple positioned at one end of said coupling having a front end and a rear end, said nipple having at least one tube locking barb positioned between said nipple front end and nipple rear end;
   c) a first threaded mating portion positioned at another end opposite said one end, said first threaded mating portion having a front end and a rear end, said first threaded matins portion for engaging one of a pair of fittings;
   d) a first annular groove immediately adjacent said front end of said first threaded mating portion;
   e) a second threaded mating portion positioned immediately adjacent said nipple rear end and of a diameter substantially greater than said nipple, said second threaded mating portion having a front end and a rear end, said second threaded mating portion for engaging the other of a pair of fittings;
   f) a second annular groove immediately adjacent said second threaded mating portion rear end and of a diameter substantially the same as said first annular groove;
   g) a wrenching portion immediately adjacent said second annular groove and having a front end and rear end and extending above said first threaded mating portion; and,
   h) said wrenching portion rear end including a shoulder extending below said wrenching portion front end.

2. A coupling as recited in claim 1 further comprising a tubing nut that mates with said second threaded mating portion, said tubing nut in conjunction with said at least one tube locking barb prevents an attached tube from slipping-off said nipple when a fluid-pressure is applied to said tube.

3. A coupling as recited in claim 1, wherein:
   a) said wrenching portion has a plurality of planar surfaces for selectively corresponding with the wrenching tool.

4. A coupling as recited in claim 3, wherein:
   a) said wrenching portion has six planar surfaces for selectively corresponding with the wrenching tool.

5. A coupling as recited in claim 1, further including:
a) an "o" ring engaged with said first annular grove, providing a seal for preventing fluid leaks.

6. A coupling as recited in claim 1, wherein:
a) said first threaded mating portion has fewer threads than said second threaded mating portion.

7. A coupling as recited in claim 6, wherein:
a) said first threaded mating portion is about three to about five threads; and,
b) said second threaded mating portion is about six to about nine threads.

8. A coupling as recited in claim 5, wherein;
a) said first annular groove has a diameter;
b) said first threaded mating portion has an outer diameter of greater value than the diameter of said first annular groove;
c) said shoulder has a diameter of greater value than the outer diameter of said first threaded mating portion, whereby said "o" ring when placed in said first annual groove has a diameter of slightly greater value than the diameter of said shoulder; and,
d) said wrenching portion has a diameter of greater value than the diameter of said "o" ring.

9. A coupling as recited in claim 1, wherein:
a) said first threaded mating portion has the same thread orientation as said second threaded mating portion.

10. A coupling as recited in claim 1, wherein:
a) said second threaded mating portion has a diameter about equal to the diameter of said first threaded mating portion.

11. A coupling as recited in claim 1, wherein:
a) said nipple further includes an end inside surface having a polygonal shaped profile for selectively corresponding with the wrenching tool to allow tightening and loosening of the coupling.

12. A coupling as recited in claim 11, wherein:
a) said wrenching portion has a plurality of planar surfaces for selectively corresponding with the wrenching tool.

13. A coupling as recited in claim 12, wherein:
a) said wrenching portion has six planar surfaces for corresponding with the wrenching tool.

14. A coupling as recited in claim 11, further including:
a) an "o" ring engaged with said first annular grove, providing a seal for preventing fluid leaks.

15. A coupling as recited in claim 11, wherein:
a) said first threaded mating portion has fewer threads than said second threaded mating portion.

16. A coupling as recited in claim 15, wherein:
a) said first threaded mating portion is about three to about five threads; and
b) said second threaded mating portion is about six to about nine threads.

17. A coupling as recited in claim 14, further including:
a) said first annular groove has a diameter;
b) said first threaded mating portion has a diameter of greater value than the diameter of said first annular groove;
c) said shoulder has a diameter of greater value than said diameter of said first threaded mating portion, whereby said "o" ring when placed in said first annual groove has a diameter of slightly greater value than the diameter of said shoulder; and d) said wrenching portion has a diameter of greater value than the diameter of said "o" ring.

18. A coupling as recited in claim 11, wherein:
a) said first threaded mating portion has the same thread orientation as said second threaded mating portion.

19. A coupling as recited in claim 11, wherein:
a) said second threaded mating portion has a diameter about equal to the diameter of said first threaded mating portion.

20. A coupling for connecting a tube to a pair of fittings that can be tightened and loosened with a wrenching tool, comprising:
a) said coupling having a longitudinal bore for fluids to pass through;
b) a nipple positioned at one end of said coupling having a front end and a rear end, said nipple having at least one tube locking barb positioned between said nipple front end and nipple rear end;
c) a first mating portion positioned at another end opposite said one end, said first threaded mating portion having a front end and a rear end, said first threaded mating portion for engaging one of a pair of fittings;
d) a first annular groove immediately adjacent said front end of said first threaded mating portion;
e) a second mating positioned immediately immediately adjacent said nipple rear end and of a diameter substantially greater than said nipple, said second mating portion having a front end and a rear end, said second threaded mating portion for engaging the other of a pair of fittings;
f) a second annular groove immediately adjacent said second mating portion rear end and of a diameter substantially the same as said first annular groove;
g) a wrenching portion immediately adjacent said second annular groove and having a front end and rear end and extending substantially above said first threaded mating portion;
h) said wrenching portion rear end including a shoulder extending below said wrenching portion front end;
i) a tubing nut having at least two locking nubs on its interior surface that mates with said second mating portion, said tubing nut in conjunction with said at least one tube locking barb prevents an attached tube from slipping-off said nipple when fluid-pressure is applied to said tube; and,
j) said second mating portion is at least two channels disposed on said coupling, said channels include a first channel portion that is substantially aligned with a longitudinal axis of said coupling and a second channel portion that extends said channel in an annular direction about said longitudinal axis of said coupling and angled toward said nipple, whereby the nubs mate with said channels for locking said tube to said nipple.

21. A coupling for connecting a tube to a pair of fittings that can be tightened and loosened with a wrenching tool, comprising:
a) said coupling having a longitudinal bore for fluids to pass through;
b) a nipple positioned at one end of said coupling having a front end and a rear end, said nipple having at least one tube locking barb positioned between said nipple front end and nipple rear end;
c) a first mating portion positioned at another end opposite said one end, said first mating portion having a front end and a rear end, said first threaded mating portion for engaging one of a pair of fittings;

d) a first annular groove immediately adjacent said front end of said first mating portion;

e) a second mating portion positioned immediately adjacent said nipple rear end and of a diameter substantially greater than said nipple, said second mating portion having a front end and a rear end, said second threaded mating portion for engaging the other of a pair of fittings;

f) a second annular groove immediately adjacent said second mating portion rear end and of a diameter substantially the same as said first annular groove;

g) a wrenching portion immediately adjacent said second annular groove and having a front end and rear end and extending substantially above said first mating portion;

h) said wrenching portion rear end including a shoulder extending below said wrenching portion front end;

i) a tubing nut having at least two locking nubs on its interior surface that mates with said second mating portion, said tubing nut in conjunction with said at least one tube locking barb prevents an attached tube from slipping-off said nipple when fluid-pressure is applied to said tube; and, j) said second threaded mating portion is at least two channels disposed on said coupling, said channels include a first channel portion that is substantially aligned with a longitudinal axis of said coupling, and a second channel portion that extends said channel in an annular direction about said longitudinal axis of said coupling and a third channel portion that extends said channels substantially parallel to said longitudinal axis of said coupling and toward said nipple, whereby the nubs mate with said channels for locking said tube to said nipple.

* * * * *